(12) United States Patent
Yamazaki (10) Patent No.: US 11,072,038 B2
(45) Date of Patent: Jul. 27, 2021

(54) METHOD OF MANUFACTURING MOLD

(71) Applicant: TOYOTA JIDOSHA KABUSHIKI KAISHA, Toyota (JP)

(72) Inventor: Tomoya Yamazaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 16/255,866

(22) Filed: Jan. 24, 2019

(65) Prior Publication Data
US 2019/0270163 A1 Sep. 5, 2019

(30) Foreign Application Priority Data
Mar. 2, 2018 (JP) .............................. JP2018-037744

(51) Int. Cl.
| | |
|---|---|
| *B23K 26/342* | (2014.01) |
| *B23K 26/364* | (2014.01) |
| *B23K 37/00* | (2006.01) |
| *B23K 26/70* | (2014.01) |
| *B22D 11/124* | (2006.01) |
| *B23K 101/04* | (2006.01) |

(52) U.S. Cl.
CPC .......... *B23K 26/342* (2015.10); *B23K 26/364* (2015.10); *B23K 26/703* (2015.10); *B23K 37/003* (2013.01); *B22D 11/124* (2013.01); *B23K 2101/04* (2018.08)

(58) Field of Classification Search
CPC .. B23K 26/342; B23K 26/364; B23K 37/003; B23K 26/703; B23K 2101/04; B22D 11/124
See application file for complete search history.

(56) References Cited

U.S. PATENT DOCUMENTS

| | | | |
|---|---|---|---|
| 2013/0273264 A1* | 10/2013 | Mourou .................. | B29C 45/73 427/586 |
| 2014/0255198 A1* | 9/2014 | El-Wardany ............ | B22F 10/20 416/229 A |
| 2015/0030787 A1 | 1/2015 | Clemen | |
| 2018/0050422 A1* | 2/2018 | Fong .................. | B23K 26/1464 |
| 2018/0272406 A1* | 9/2018 | Saini ...................... | B33Y 10/00 |

FOREIGN PATENT DOCUMENTS

| | | |
|---|---|---|
| JP | H03-099767 A | 4/1991 |
| JP | 2005-52892 A | 3/2005 |
| JP | 2013-194263 A | 9/2013 |

* cited by examiner

*Primary Examiner* — Geoffrey S Evans
(74) *Attorney, Agent, or Firm* — Oblon, McClelland, Maier & Neustadt, L.L.P.

(57) ABSTRACT

A method of manufacturing a mold includes the processes of: arranging a channel member in a recessed groove formed on a surface of a mold body; irradiating an opening part of the recessed groove with a first laser, thereby performing a first build-up welding on a part in the vicinity of the opening part of the recessed groove; and irradiating a region on a surface of the mold body including a region where the first build-up welding has been performed with a second laser, thereby performing a second build-up welding on a region on the surface of the mold body including the region where the first build-up welding has been performed.

4 Claims, 10 Drawing Sheets

METHOD OF MANUFACTURING MOLD

CROSS REFERENCE TO RELATED APPLICATIONS

This application is based upon and claims the benefit of priority from Japanese patent application No. 2018-037744, filed on Mar. 2, 2018, the disclosure of which is incorporated herein in its entirety by reference.

BACKGROUND

The present disclosure relates to a method of manufacturing a mold, and relates to, for example, a method of manufacturing a mold including a cooling passage inside therein.

When casting is performed using a mold, a cooling passage may be formed inside the mold in order to intentionally cool a part of the mold for the purpose of preventing, for example, seizure with molten metal. For example, a method of forming a cooling path of a mold disclosed in Japanese Unexamined Patent Application Publication No. 2005-52892 closes an opening part of a recessed groove formed on a surface of the mold by a channel member made of a wire, performs build-up welding on a part in the vicinity of the opening part of the recessed groove, thereby embedding the channel member inside the mold, and a cooling path (a cooling passage) through which cooling water flows is formed of the recessed groove and the channel member.

SUMMARY

The present applicant has found the following problems. In the method of forming the cooling path of the mold disclosed in Japanese Unexamined Patent Application Publication No. 2005-52892, by using a high-output laser whose build-up speed is high when build-up welding is performed on the area in the vicinity of the opening part of the recessed groove, it is possible to perform build-up welding and manufacture a mold in a short period of time. However, when the high-output laser is applied, an amount of heat input to the channel member is large, which may cause the channel member to be damaged. Therefore, it is difficult to manufacture a mold including a cooling passage inside therein in a short period of time while preventing the channel member from being damaged.

The present disclosure has been made in view of the aforementioned problem, and provides a method of manufacturing a mold including a cooling passage inside therein in a short period of time while preventing the channel member from being damaged.

A method of manufacturing a mold according to one aspect of the present disclosure is a method of manufacturing a mold including a cooling passage inside therein, the method including the processes of:

arranging a channel member, which serves as a wall part of the cooling passage, in a recessed groove formed on a surface of a mold body;

irradiating an opening part of the recessed groove with a first laser at a first output and a first energy density, the first laser being set in such a way that the channel member is prevented from being damaged, thereby performing a first build-up welding on a part in the vicinity of the opening part of the recessed groove; and irradiating a region on a surface of the mold body including a region where the first build-up welding has been performed with a second laser at a second output that is higher than the first output and a second energy density that is lower than the first energy density, the second laser being set in such a way that a build-up speed becomes higher than in a case in which the first laser is applied, thereby performing a second build-up welding on a region on the surface of the mold body including the region where the first build-up welding has been performed.

When the channel member is buried in the mold body, the first build-up welding is performed using the first laser by which the channel member is not damaged, and after that the second build-up welding is performed using the second laser whose build-up speed is faster than that of the first laser. Therefore, it is possible to manufacture the mold in a short period of time while preventing the channel member from being damaged.

In the aforementioned method of manufacturing the mold, the first laser is preferably a pulsed laser and the second laser is preferably a continuous wave laser.

The aforementioned method of manufacturing the mold preferably includes processing, after the process of performing the first build-up welding but before the second build-up welding is performed, a region on which at least the first build-up welding has been performed in a planar shape, thereby making the region in which the first build-up welding has been performed flush with the surface of the mold body.

As described above, by making the surface of the mold body flush with the region where the first build-up welding has been performed, it is possible to prevent the hollow part from being generated in the region where the second build-up welding has been performed.

In the aforementioned method of manufacturing the mold, the material of the first build-up welding is preferably different from the material of the second build-up welding.

Accordingly, the mold can be designed more freely.

According to the present disclosure, it is possible to manufacture a mold including a cooling passage inside therein in a short period of time while preventing the channel member from being damaged.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarification of the description, the following descriptions and the drawings are simplified as appropriate.

First Embodiment

Figure 1:
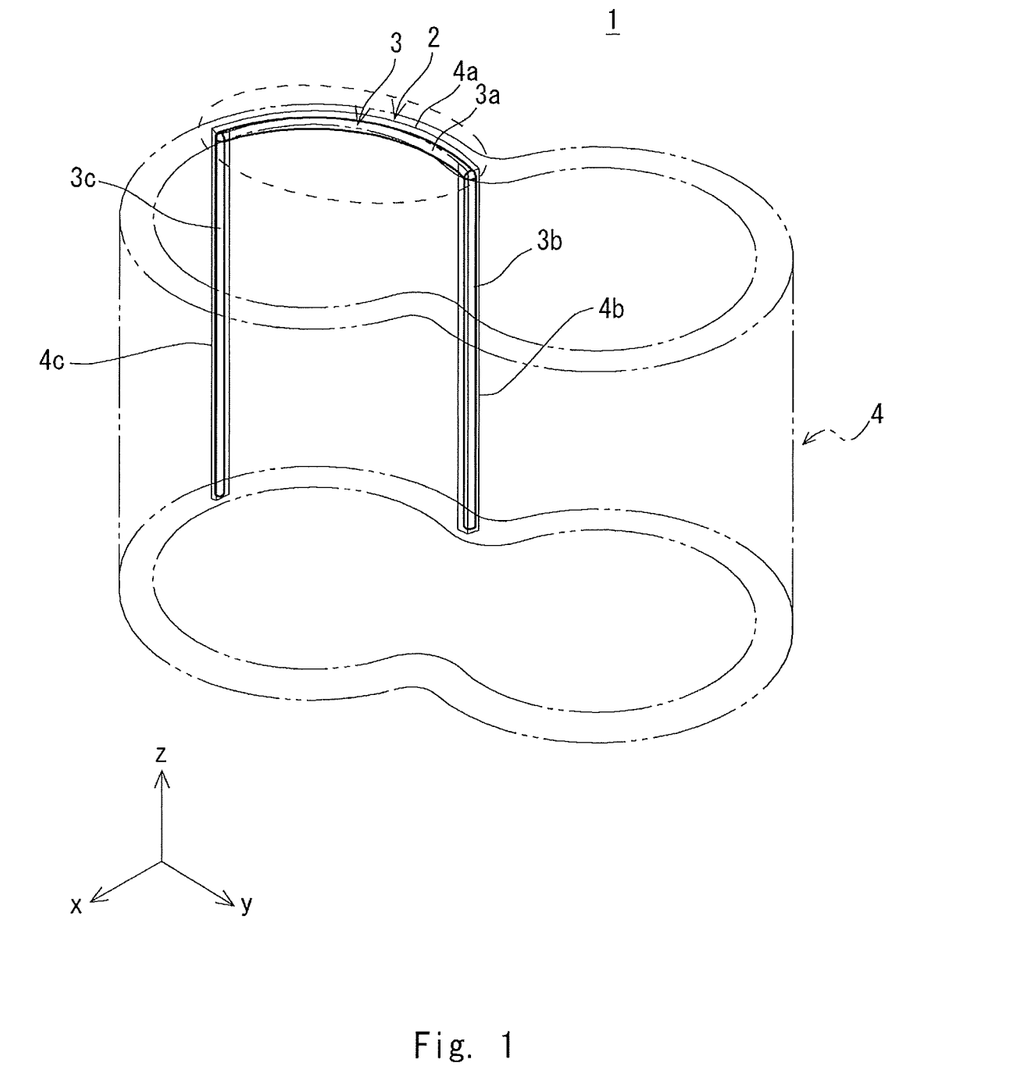
FIG. 1 is a perspective view schematically showing a mold manufactured in a first embodiment.

First, a structure of a mold manufactured in this embodiment will be explained. FIG. 1 is a perspective view schematically showing the mold manufactured in this embodiment. In FIG. 1, the outer shape of the mold is shown by an alternate long and two short dashes line. A mold 1 manufactured in this embodiment includes a cooling passage 2 in the vicinity of a surface thereof, as shown in FIG. 1.

The mold 1 is, for example, a die-casting mold. More specifically, the mold 1 is, for example, a core for molding a water jacket of a cylinder block, and includes the cooling passage 2 in the vicinity of the surface for molding the bottom surface of the water jacket. However, it is sufficient that the mold 1 include the cooling passage 2 to intentionally cool a part of the surface.

The cooling passage 2 is a flow path through which liquid or gas, which is a cooling medium, flows inside thereof. The cooling passage 2 includes, for example, a pipe member 3 made of copper as a channel member. The pipe member 3 is buried inside the mold 1, and the wall part of the cooling passage 2 is formed of an inner peripheral surface of the pipe member 3. Therefore, the cooling medium flows inside the pipe member 3.

The aforementioned pipe member 3 includes a cooling part 3a arranged in a desired cooling part in the mold 1, a supply part 3b that supplies the cooling medium to the cooling part 3a, and a discharge part 3c that discharges the cooling medium from the cooling part 3a, and the cooling part 3a, the supply part 3b, and the discharge part 3c are continuously formed, for example, in a gate shape when they are seen from the X-axis direction.

Figure 2:
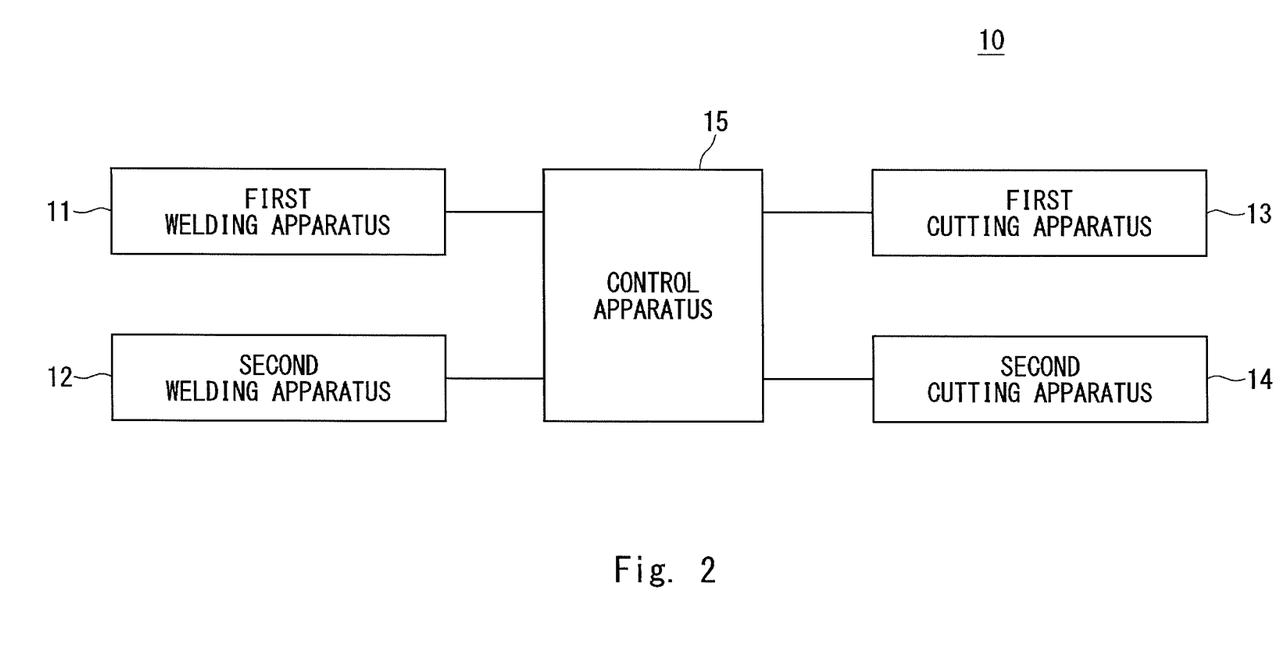
FIG. 2 is a block diagram schematically showing an apparatus for manufacturing the mold according to the first embodiment.

Next, a structure of a manufacturing apparatus used in the method of manufacturing the mold according to this embodiment will be explained. FIG. 2 is a block diagram schematically showing the apparatus for manufacturing the mold according to this embodiment. An apparatus 10 of manufacturing the mold 1 (hereinafter this apparatus may be simply referred to as a manufacturing apparatus) according to this embodiment includes a first welding apparatus 11, a second welding apparatus 12, a first cutting apparatus 13, a second cutting apparatus 14, and a control apparatus 15, as shown in FIG. 2.

The first welding apparatus 11, the details of which will be explained later, performs build-up welding by supplying, for example, carbon steel while applying a first laser. The second welding apparatus 12, the details of which will be explained later, performs build-up welding by supplying, for example, carbon steel while applying a second laser.

The first cutting apparatus 13, the details of which will be explained later, cuts a first build-up welding part 5 formed in the mold body 4 substantially in a planar shape (see FIG. 6). That is, the first cutting apparatus 13 chamfers the first build-up welding part 5. The second cutting apparatus 14, the details of which will be explained later, cuts a second build-up welding part 6 formed in the mold body 4, whereby a cavity shape is formed (see FIG. 8).

The control apparatus 15 controls the first welding apparatus 11, the second welding apparatus 12, the first cutting apparatus 13, and the second cutting apparatus 14 in order to achieve the method of manufacturing the mold 1 that will be described later. The control apparatus 15 is able to achieve the method of manufacturing the mold 1 that will be described later by executing a program.

Figure 3:
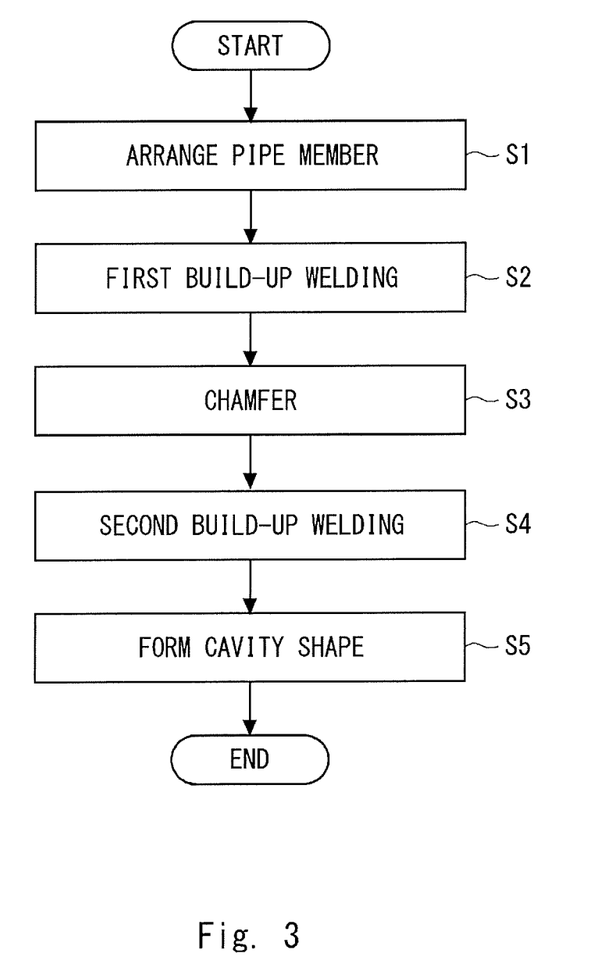
FIG. 3 is a flowchart showing a method of manufacturing the mold according to the first embodiment.
Figure 4:
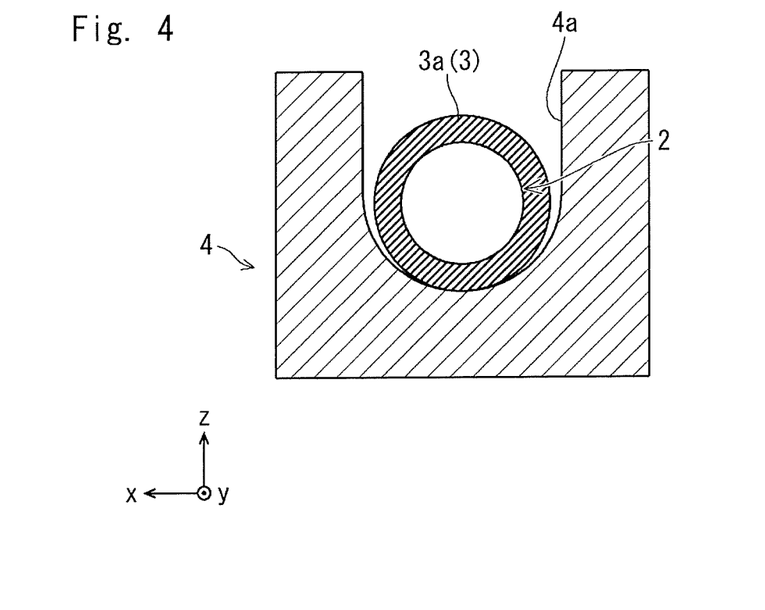
FIG. 4 is a cross-sectional view showing a state in which a pipe member is arranged in a recessed groove of a mold body in the method of manufacturing the mold according to the first embodiment.
Figure 5:
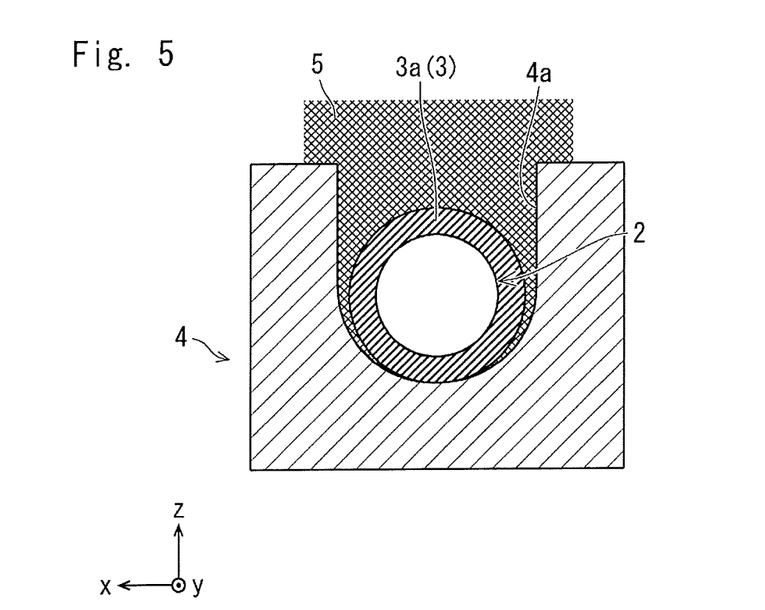
FIG. 5 is a cross-sectional view showing a state in which a first build-up welding is performed in the method of manufacturing the mold according to the first embodiment.
Figure 7:
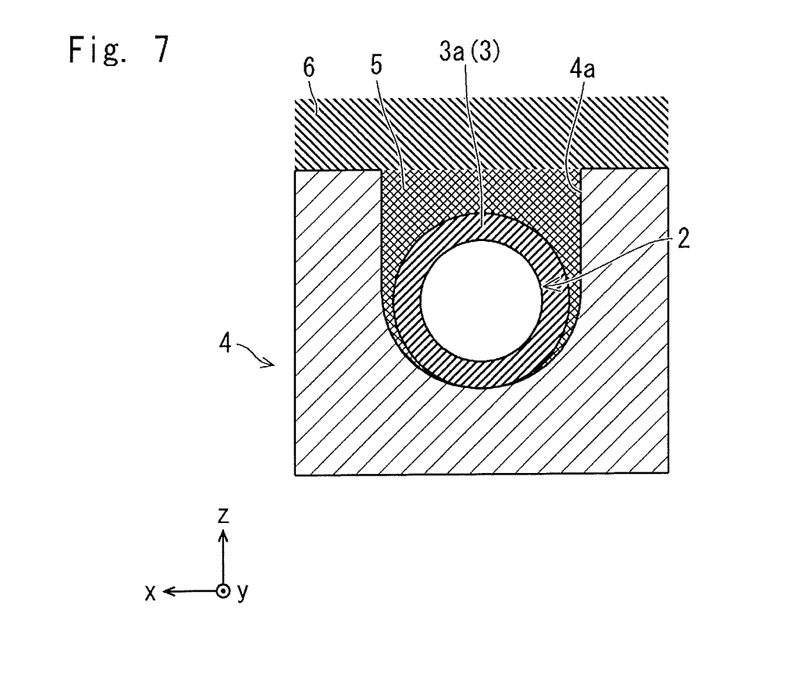
FIG. 7 is a cross-sectional view showing a state in which a second build-up welding is performed in the method of manufacturing the mold according to the first embodiment.
Figure 8:
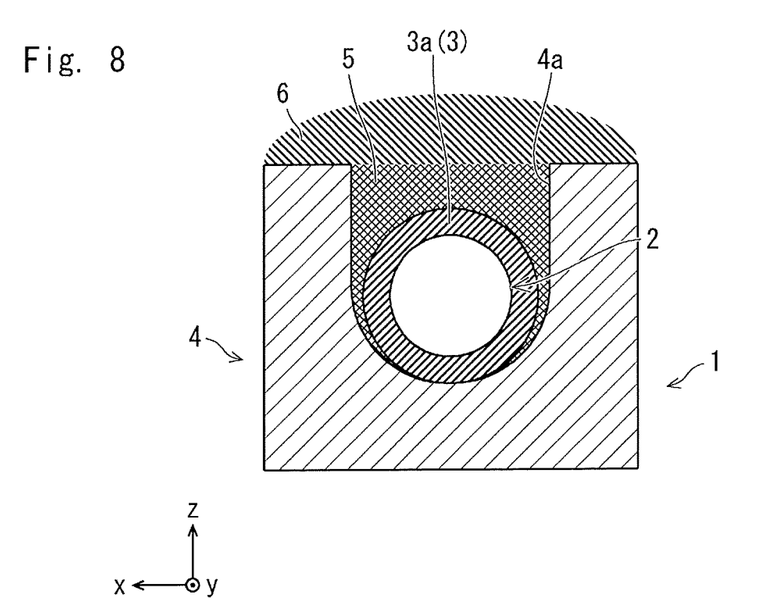
FIG. 8 is a cross-sectional view showing a state in which the second build-up welding part is shaped in the method of manufacturing the mold according to the first embodiment.

Next, the method of manufacturing the mold 1 according to this embodiment will be explained. FIG. 3 is a flowchart showing the method of manufacturing the mold according to this embodiment. FIG. 4 is a cross-sectional view showing a state in which a pipe member is arranged in a recessed groove of the mold body in the method of manufacturing the mold according to this embodiment. FIG. 5 is a cross-sectional view showing a state in which the first build-up welding is performed in the method of manufacturing the mold according to this embodiment. FIG. 6 is a cross-sectional view showing a state in which the first build-up welding part is chamfered in the method of manufacturing the mold according to this embodiment. FIG. 7 is a cross-sectional view showing a state in which the second build-up welding is performed in the method of manufacturing the mold according to this embodiment. FIG. 8 is a cross-sectional view showing a state in which the second build-up welding part is shaped in the method of manufacturing the mold according to this embodiment.

Now, in the three-dimensional coordinate system (XYZ coordinate system), as shown in FIG. 1, in this embodiment, the mold 1 configured to be able to cool a desired area (the area surrounded by the dashed line) of a surface of the mold 1 on the Z-axis positive side is manufactured.

First, as shown in FIG. 4, a recessed groove 4a is formed in the mold body 4 molded in advance, and the pipe member 3 is arranged in the recessed groove 4a (S1). The mold body 4 is molded to a position where the cooling part 3a can be buried in the Z axis in a state in which the cooling part 3a of the pipe member 3 is arranged in a predetermined position. That is, the forming of the mold body 4 is incomplete in the Z axis compared to the mold 1 to be manufactured.

The mold body 4 is molded, for example, from the end part of the cooling part 3a on the Z-axis positive side to a position where a predetermined value (e.g., about 1 mm) is added in the Z axis in a state in which the cooling part 3a of the pipe member 3 is arranged in a predetermined position, and is made of carbon steel. The recessed groove 4a is formed in a desired area of the surface of the mold body 4 on the Z-axis positive side, and is bent, for example, in such a way that it conforms to the shape of the mold body 4 when it is seen from the Z-axis direction.

In this case, as shown in FIG. 1, a first insertion hole 4b into which the supply part 3b of the pipe member 3 is inserted and a second insertion hole 4c into which the discharge part 3c of the pipe member 3 is inserted are formed in the mold body 4. The end part of the first insertion hole 4b on the Z-axis negative side reaches the end surface of the mold body 4 on the Z-axis negative side, and the end part of the first insertion hole 4b on the Z-axis positive side reaches the end part of the recessed groove 4a on the Y-axis positive side. The end part of the second insertion hole 4c on the Z-axis negative side reaches the end part of the mold body 4 on the Z-axis negative side, and the end part of the second insertion hole 4c on the Z-axis positive side reaches the end part of the recessed groove 4a on the Y-axis negative side. That is, the first insertion hole 4b, the recessed groove 4a, and the second insertion hole 4c are continuously formed.

The pipe member 3 is inserted into the first insertion hole 4b, the recessed groove 4a, and the second insertion hole 4c. That is, the pipe member 3 that has a substantially gate shape is made to come close to the mold body 4 from the Z-axis positive side of the mold body 4 and the discharge part 3c of the pipe member 3 is inserted into the second insertion hole 4c while the supply part 3b of the pipe member 3 is being inserted into the first insertion hole 4b. Further, the pipe member 3 is pushed in the Z-axis negative direction, whereby the cooling part 3a of the pipe member 3 is inserted into the recessed groove 4a.

Next, the control apparatus 15 controls the first welding apparatus 11 and supplies carbon steel while irradiating the opening part of the recessed groove 4a with the first laser, thereby performing the first build-up welding in the vicinity of the opening part of the recessed groove 4a (S2). Accordingly, as shown in FIG. 5, a part of the pipe member 3 and an area in the vicinity of the opening part of the recessed groove 4a are melted along with the carbon steel that has been supplied, and the opening part of the recessed groove 4a is closed by the first build-up welding part 5.

The first laser is applied at a first output and a first energy density set in such a way that the pipe member 3 made of copper is not damaged. That "the pipe member 3 is not damaged" means that the internal shape of the pipe member 3 is substantially maintained. Note that the energy density is set based on the laser output and the laser irradiation range.

A pulsed laser may be used as the first laser, and a semiconductor laser, a fiber laser or the like is intermittently applied. While the energy density of the pulsed laser is higher than that of a Continuous Wave (CW) laser, the pulsed laser is intermittently input with low power. Therefore, the heat input amount of the pulsed laser is small, which successfully prevents the pipe member 3 from being damaged. Therefore, the pulsed laser is suitable as the first laser.

When the pipe member 3 is made of copper, the laser is less likely to be absorbed in the pipe member 3. However, since the pulsed laser has an energy density higher than that of the CW laser, a part of the pipe member 3 can be well melted.

However, if the first laser is set to have the first energy density and the first output at which the pipe member 3 is not damaged and a part of the pipe member 3 can be well melted when the pipe member 3 is irradiated with the first laser, the CW laser may be used as the first laser.

Figure 6:
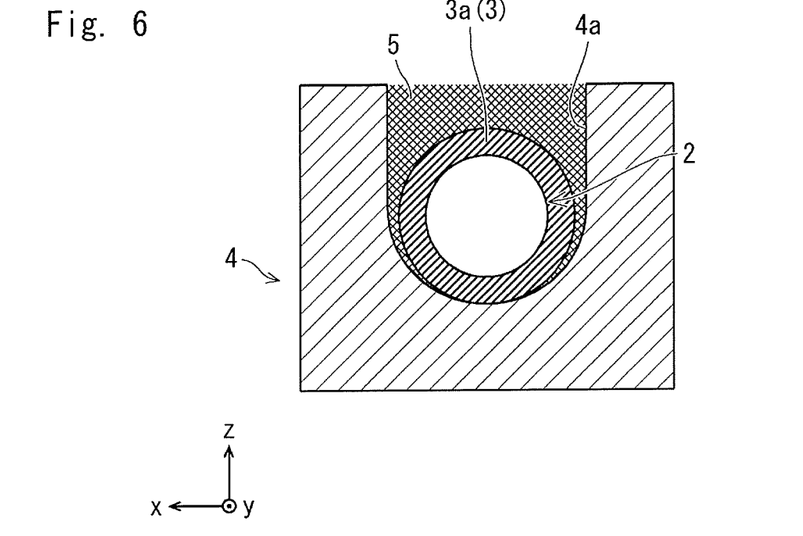
FIG. 6 is a cross-sectional view showing a state in which the first build-up welding part is chamfered in the method of manufacturing the mold according to the first embodiment.

Next, the control apparatus 15 controls the first cutting apparatus 13, and chamfers the first build-up welding part 5, whereby the surface of the mold body 4 on the Z-axis positive side and the surface of the first build-up welding part 5 on the Z-axis positive side are made substantially flush with each other, as shown in FIG. 6 (S3).

At this time, in such a way that a step is not generated between the surface of the mold body 4 on the Z-axis positive side and the surface of the first build-up welding part 5 on the Z-axis positive side, the area in the vicinity of the first build-up welding part 5 on the surface of the mold body 4 on the Z-axis positive side may be cut along with the first build-up welding part 5. Accordingly, it is possible to definitely make the surface of the mold body 4 on the Z-axis positive side substantially flush with the surface of the first build-up welding part 5 on the Z-axis positive side.

Next, the control apparatus 15 controls the second welding apparatus 12 and supplies carbon steel while irradiating a region including the first build-up welding part 5 on the surface of the mold body 4 on the Z-axis positive side with the second laser, whereby this region is subjected to the second build-up welding (S4).

Accordingly, as shown in FIG. 7, the second build-up welding part 6 is formed on the surface of the mold body 4 on the Z-axis positive side and the surface of the first build-up welding part 5 on the Z-axis positive side. In this case, since the surface of the mold body 4 on the Z-axis positive side is substantially flush with the surface of the first build-up welding part 5 on the Z-axis positive side, it is possible to prevent a hollow part from being generated in the second build-up welding part 6.

The second laser is applied at a second output that is higher than the first output and a second energy density that is lower than the first energy density set in such a way that the build-up speed (i.e., build speed) of the second laser is faster than that of the first laser and the deformation of the mold body 4 is reduced. A CW laser may be used as the second laser, and a semiconductor laser is, for example, continuously applied.

While the CW laser has an energy density lower than that of the pulsed laser, the CW laser is continuous irradiation with high power. Therefore, the heat input amount is large and the build speed is high. Therefore, the CW laser is suitable as the second laser.

Next, the control apparatus 15 controls the second cutting apparatus 14 and cuts the second build-up welding part 6, thereby forming the cavity shape (S5), as shown in FIG. 8. The mold 1 can be thus manufactured.

According to the method of manufacturing the aforementioned mold 1, when the pipe member 3 is buried into the mold body 4, the first build-up welding is performed using the first laser by which the pipe member 3 is not damaged, and after that the second build-up welding is performed using the second laser whose build speed is faster than that of the first laser. Therefore, according to the method of manufacturing the mold 1 according to this embodiment, it is possible to manufacture the mold 1 in a short period of time while preventing the pipe member 3 from being damaged.

While the cooling passage 2 according to this embodiment is made of copper in view of corrosion resistance and thermal conductivity when water is used as the cooling medium, it is sufficient that the cooling passage 2 be made of metal.

Second Embodiment

Figure 9:
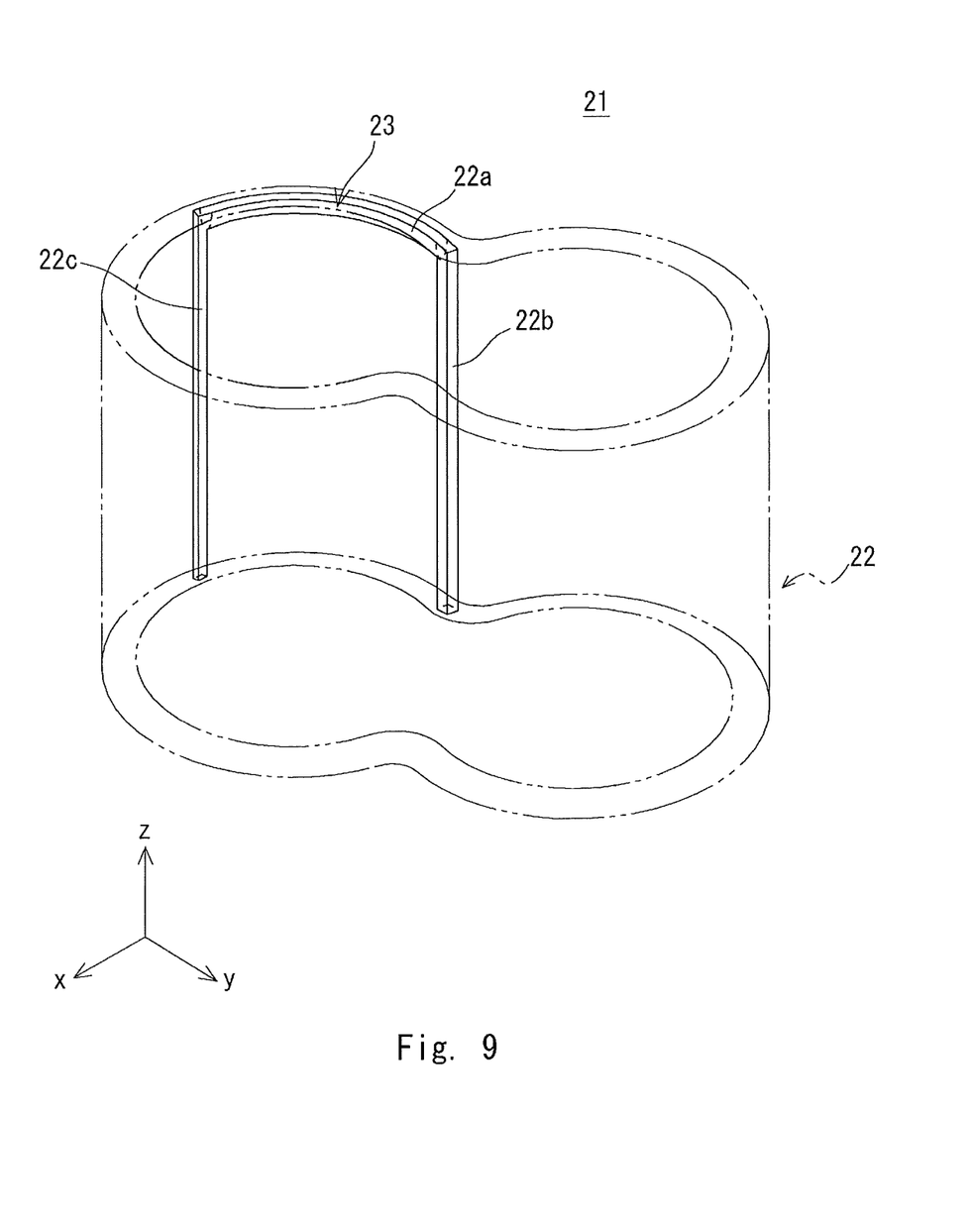
FIG. 9 is a perspective view schematically showing a mold manufactured in a second embodiment.
Figure 10:
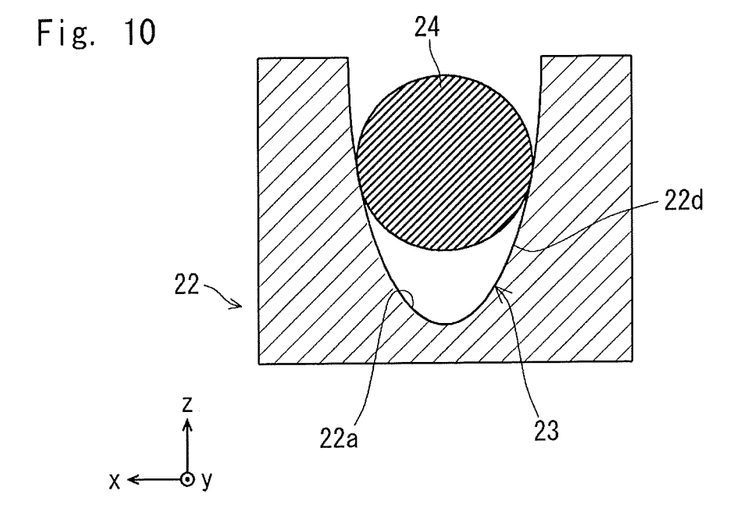
FIG. 10 is a cross-sectional view showing a state in which a metal wire is arranged in a recessed groove of a mold body in a method of manufacturing the mold according to the second embodiment.
Figure 11:
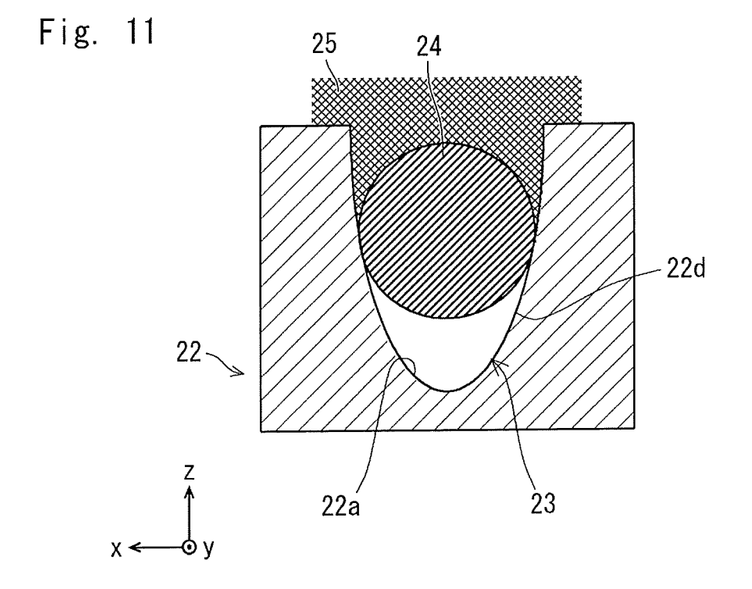
FIG. 11 is a cross-sectional view showing a state in which a first build-up welding is performed in the method of manufacturing the mold according to the second embodiment.
Figure 12:
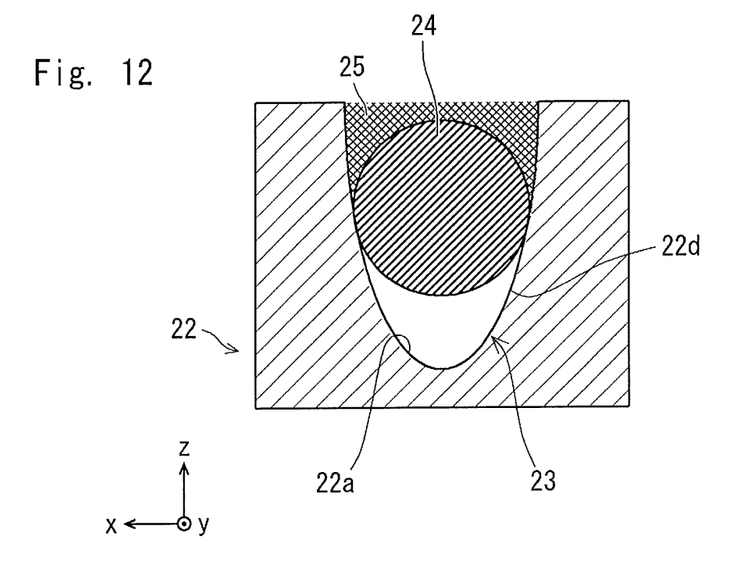
FIG. 12 is a cross-sectional view showing a state in which the first build-up welding part is chamfered in the method of manufacturing the mold according to the second embodiment.
Figure 13:
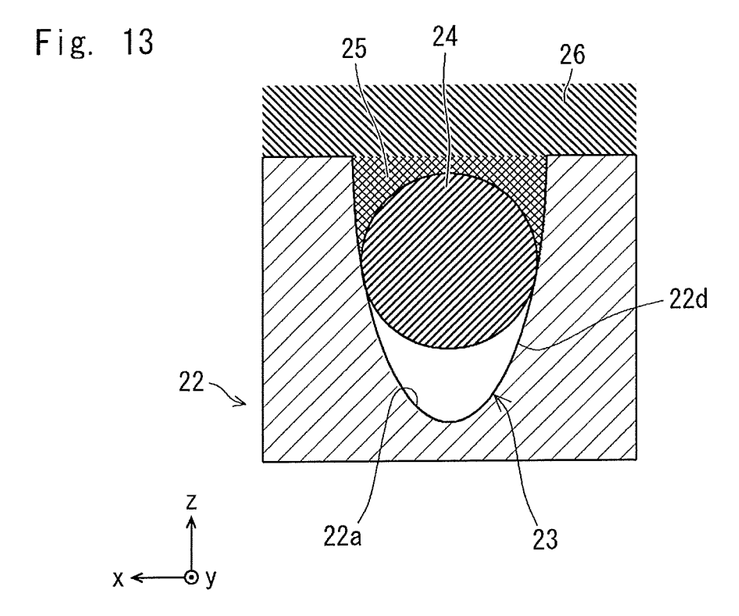
FIG. 13 is a cross-sectional view showing a state in which a second build-up welding is performed in the method of manufacturing the mold according to the second embodiment.
Figure 14:
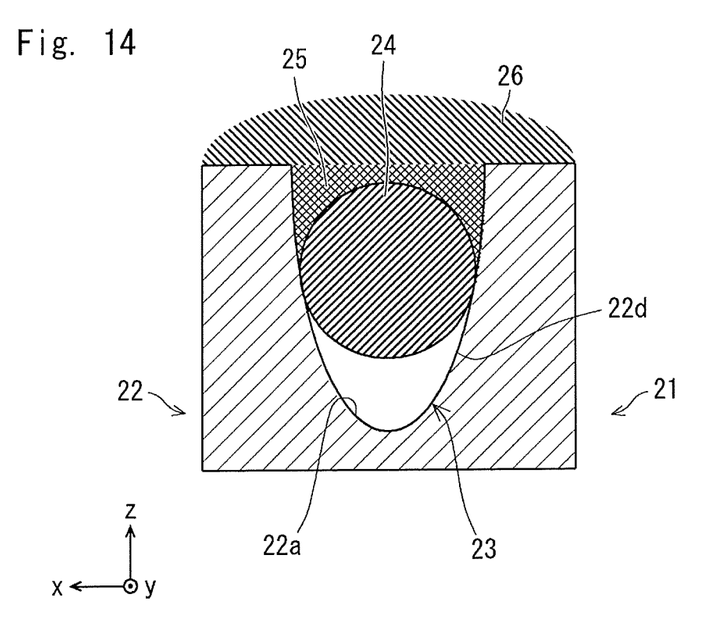
FIG. 14 is a cross-sectional view showing a state in which the second build-up welding part is shaped in the method of manufacturing the mold according to the second embodiment.

FIG. 9 is a perspective view schematically showing a mold manufactured in this embodiment. FIG. 10 is a cross-sectional view showing a state in which a metal wire is arranged in a recessed groove of a mold body in the method of manufacturing the mold according to this embodiment. FIG. 11 is a cross-sectional view showing a state in which a first build-up welding is performed in the method of manufacturing the mold according to this embodiment. FIG. 12 is a cross-sectional view showing a state in which the first build-up welding part is chamfered in the method of manufacturing the mold according to this embodiment. FIG. 13 is a cross-sectional view showing a state in which a second build-up welding is performed in the method of manufacturing the mold according to this embodiment. FIG. 14 is a cross-sectional view showing a state in which the second build-up welding part is shaped in the method of manufacturing the mold according to this embodiment.

In FIG. 9, the outer shape of the mold is shown by an alternate long and two short dashes line. Further, in FIG. 9, in order to clarify the drawings, the metal wire is not shown. Since the method of manufacturing the mold according to this embodiment is substantially the same as the method of manufacturing the mold 1 according to the first embodiment, repetitive description will be omitted and components equal to each other will be denoted by the same symbols.

While a mold 21 according to this embodiment has a structure substantially equal to the mold 1 according to the first embodiment, a cooling passage 23 is formed using a recessed groove 22a formed in a mold body 22 without burying the pipe member 3.

Specifically, as shown in FIG. 9, similar to the mold body 4 according to the first embodiment, the recessed groove 22a is formed in the mold body 22. Then a first through-hole 22b that penetrates from a surface of the mold body 22 on the Z-axis negative side to the end part of the recessed groove 22a on the Y-axis positive side and a second through-hole 22c that penetrates from a surface of the mold body 22 on the Z-axis negative side to the end part of the recessed groove 22a on the Y-axis negative side are formed in the mold body 22.

Using the aforementioned mold body 22, first, in order to close the opening part of the recessed groove 22a of the mold body 22, a metal wire 24 is arranged in the recessed groove 22a of the mold body 22 as a channel member, as shown in FIG. 10. Accordingly, the cooling passage 23 through which the cooling medium flows is formed of a space surrounded by the wall surface of the recessed groove 22a of the mold body 22 (i.e., the both side wall surfaces and the bottom surface) and the peripheral surface of the metal wire 24, the first through-hole 22b, and the second through-hole 22c.

The mold body 22 preferably includes a locking part 22d in such a way that the metal wire 24 remains in a predetermined position of the recessed groove 22a. The locking part 22d, which is formed in at least one of opposing side wall surfaces of the recessed groove 22a, is, for example, an inclined surface that is inclined so as to approach the other side wall surface toward the Z-axis negative side. However, it is sufficient that the locking part 22d have such a shape that it enables the metal wire 24 to remain in a predetermined position.

The metal wire 24 has such a shape (e.g., the length or the thickness) that it can close substantially the whole area of the opening part of the recessed groove 22a, and may be, for example, copper, which has a high corrosion resistance. While the cross-sectional shape of the metal wire 24 is a substantially circular shape in the drawings, the cross-sectional shape is not particularly limited and it is sufficient that it be a continuous member.

The following processes are substantially equal to the processes of S2-S5 according to the first embodiment. That is, as shown in FIG. 11, a first build-up welding part 25 is formed in the vicinity of the opening part of the recessed groove 22a using the first laser. In this case, the first laser is set to the first output and the first energy density at which the metal wire 24 is not damaged (i.e., the internal shape of the cooling passage 23 is substantially maintained).

Then, as shown in FIG. 12, a region including at least the first build-up welding part 25 is chamfered, and further a second build-up welding part 26 is formed on an area including the first build-up welding part 25 on the surface of the mold body 22 on the Z-axis positive side using the second laser, as shown in FIG. 13. In this case, the second laser is set to have the second output that is higher than the first output and the second energy density that is lower than the first energy density so that the build-up speed (i.e., the build speed) is higher than that of the first laser and the deformation of the mold body 22 is reduced.

Lastly, as shown in FIG. 14, the second build-up welding part 26 is formed to have a cavity shape, whereby the mold 21 can be manufactured.

According to the method of manufacturing the mold 21, when the cooling passage 23 is formed, the first build-up welding is performed using the first laser at which the metal wire 24 is not damaged, and after that, the second build-up welding is performed using the second laser whose build speed is faster than that of the first laser. Therefore, according to the method of manufacturing the mold 21 of this embodiment, the mold 21 can be manufactured in a short period of time while preventing the metal wire 24 from being damaged.

Third Embodiment

While the material of the first build-up welding part is the same as the material of the second build-up welding part in the method of manufacturing the mold according to the first and second embodiments, the material of the first build-up welding part and the material of the second build-up welding part may be different from each other. Accordingly, the mold can be designed more freely.

The present disclosure is not limited to the aforementioned embodiments and may be changed as appropriate without departing from the spirit of the present disclosure.

For example, while the mold body according to the aforementioned embodiments is made of, for example, carbon steel, the material of the mold body may be changed as appropriate depending on a molded object or the like. Further, the material supplied when the first build-up welding is performed and the material supplied when the second build-up welding is performed can be changed as appropriate depending on the material of the mold body or the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a mold including a cooling passage inside therein, the method comprising the processes of:

arranging a channel member, which serves as a wall part of the cooling passage, in a recessed groove formed on a surface of a mold body;

irradiating an opening part of the recessed groove with a first laser at a first output and a first energy density, the first laser being set in such a way that the channel member is prevented from being damaged, thereby performing a first build-up welding on a part in the vicinity of the opening part of the recessed groove; and irradiating a region on a surface of the mold body including a region where the first build-up welding has been performed with a second laser at a second output that is higher than the first output and a second energy density that is lower than the first energy density, the second laser being set in such a way that a build-up speed becomes higher than in a case in which the first laser is applied, thereby performing a second build-up welding on a region on the surface of the mold body including the region where the first build-up welding has been performed.

2. The method of manufacturing the mold according to claim 1, wherein
the first laser is a pulsed laser, and
the second laser is a continuous wave laser.

3. The method of manufacturing the mold according to claim 1, comprising processing, after the process of performing the first build-up welding but before the second build-up welding is performed, a region on which at least the first build-up welding has been performed in a planar shape, thereby making the region in which the first build-up welding has been performed flush with the surface of the mold body.

4. The method of manufacturing the mold according to claim 1, wherein the material of the first build-up welding is different from the material of the second build-up welding.

* * * * *